March 18, 1969  R. A. NIGHTINGALE  3,433,238
ANGULAR POSITION INDICATORS FOR ROTATABLE SHAFTS
Filed April 27, 1966  Sheet 1 of 2

INVENTOR
Robert Allen Nightingale
BY
Baldwin & Wight
ATTORNEYS

United States Patent Office 3,433,238
Patented Mar. 18, 1969

3,433,238
ANGULAR POSITION INDICATORS FOR
ROTATABLE SHAFTS
Robert Allen Nightingale, Chelmsford, Essex, England, assignor to The Marconi Company Limited, London, England, a British company
Filed Apr. 27, 1966, Ser. No. 545,755
Claims priority, application Great Britain, Mar. 11, 1966, 18,923/65
U.S. Cl. 137—81.5     10 Claims
Int. Cl. F15c 1/10; G06m 1/12

ABSTRACT OF THE DISCLOSURE

Apparatus for providing an indication of or effecting a control in dependence upon the angular position of a rotatable shaft includes a plurality of tracks driven together in predetermined relation to rotation of the shaft, each track having raised and unraised portions representative of two binary states. Associated with each track is a fluid conduit means positioned to discharge fluid under pressure upon the associated track. The fluid pressure in each conduit varies according to whether the fluid is discharged against a raised or unraised track portion, and the pressure variations in the several conduits are utilized to produce digital outputs dependent upon the angular position of the shaft, the digital outputs, in turn, being utilizable for effecting an indication or a control in accordance with the angular position of the shaft.

---

This invention relates to angular position fluid responsive means for rotatable shafts that is to say to means for producing a fluid responsive dependent on the angular position of a rotatable shaft. The response may be used to provide an indication of the angular position of the shaft and/or it may be used to exercise some control function, e.g. control of a machine tool, in dependence upon said position. The response itself is a fluid response by which is meant that it is in the form of a change in a flow of fluid. In many cases the fluid will be a gas, normally air, so that a pneumatic response is obtained. The fluid response may be used directly to provide an indication or exercise a control function or, if desired, it may be converted by suitable pneumatic-electric transducer means into an electrical response which is then usable for indication and/or control.

It is often required to be able accurately to indicate the position of or accurately to exercise a control function in dependence upon the position of a rotatable shaft and for these purposes to obtain information of shaft rotational position in digital form. Thus, for example, it is often desired to provide information in digital form of the position of a shaft controlling the azimuth or elevation of an aerial or of a shaft by means of which a machine tool is to be controlled, in order that the digital information may conveniently be used for actuating of an indicator and/or of control means. The present invention enables problems of this nature to be solved. It provides improved means for providing information in digital form as to the position of the rotating shaft and which shall be readily capable of close discrimination, i.e. of distinguishing between positions which are very close together, which will be to a high degree of accuracy immune from interfering effects, which shall be capable of giving strong output responses, which shall be mechanically robust and suitable for direct fitting to large shafts, which shall be easy to manufacture and not require the use of special materials and which shall be of very good wearing qualities.

According to this invention an angular position fluid responsive arrangement for a rotatable shaft comprises a plurality of tracks driven by or with said shaft, the tracks consisting of raised and unraised portions representative of the two binary states, fluid conduits adjacent the tracks and having their mouths spaced closely thereto and fluid responsive means responsive to changes in the pressure conditions in the fluid conduits when a raised track position adjacent a conduit mouth is replaced by an unraised portion, or vice versa.

The tracks may be mounted side by side directly on the shaft but preferably they surround the shaft and are coupled thereto by a coupling providing substantially backlash free drive from the shaft while permitting a certain amount of eccentricity as between the shaft axis and a common track axis. A preferred form of coupling for this purpose forms the subject of the invention in British patent specification No. 758,383.

In one form of embodiment of the invention each conduit ends in a nozzle through which fluid is forced by a blower and contains a chamber one wall of which contains a diaphragm responsive to pressure in the chamber. The diaphragm is preferably arranged to move a ferromagnetic core magnetically linked to a plurality of coils one of which is fed with A.C. and from the others of which output signals are taken. A convenient arrangement comprises three coils, namely a middle fed coil and two output coils, the coupling of which to the fed coil are differentially controlled by the position of the core. With this arrangement the combination of coils produce electrical signals of digital form representative of the angular position of the shaft.

In another form of embodiment the fluid responsive means utilise the principles of the known so-called wall attachment fluid flow amplifier. In such an amplifier, in its simplest form a main air flow pipe is forked at a V-junction into two branch pipes which are "downstream" of the main pipe in the direction of air flow. The branch pipes have vents to atmosphere a little way downstream of the fork and if the branch pipes are similar and the main and branch pipes, the junction, and the vents are suitably dimensioned in accordance with known principles to produce wall attachment effect, the air flow will not, as at first might be expected, divide equally between the two pipes but, if an air flow is first established in one of them, the major part of the air flow will be maintained down that branch pipe with comparatively little air flow down the other. If also the pipes of a pair of control pipes are led in to the junction a little upstream of the fork and on opposite sides thereof it is possible to change over the major air flow from one branch pipe to the other, or vice versa, by a short pressure charge fed in to the junction via one or other control pipe. As will be seen the amplifier as a whole is analogous to an electrical bi-stable circuit, the control pipe being analogous to the inlet terminals of a bi-stable and the branch pipes being analogous to the stably selectable outputs of said bi-stable.

In an embodiment of this invention wherein the fluid responsive means utilise the principles of the wall attachment fluid flow amplifier, each pair of fluid conduits adjacent tracks driven by or with the shaft is employed to vary the pressure conditions in the pipes of a pair of control pipes of a wall attachment fluid flow amplifier so as to change over, as the shaft rotates from one angular position to another, the fluid flow operating condition of said amplifier. Preferably means are provided for pumping fluid down each conduit of a pair to a mouth adjacent a track and each control pipe of a pair is in communication, at the end remote from the amplifier, with the interior of a different fluid conduit at an intermediate point along the length thereof. With an arrangement of this nature the selectable fluid flow responses (outputs) of the amplifier may be converted into electrical signals by any convenient form of fluid flow—electrical signal transducer but, generally speaking, it is preferred to use the selectable fluid flow responses directly for control and/or indication purposes since it is readily possible to obtain adequate power in the fluid flow responses for such direct use and, accordingly, an economical compact and reliable fluid system operating in digital manner and not involving any electrical or electronic apparatus may be obtained.

The invention is illustrated in the accompanying drawings.

Figure 1:
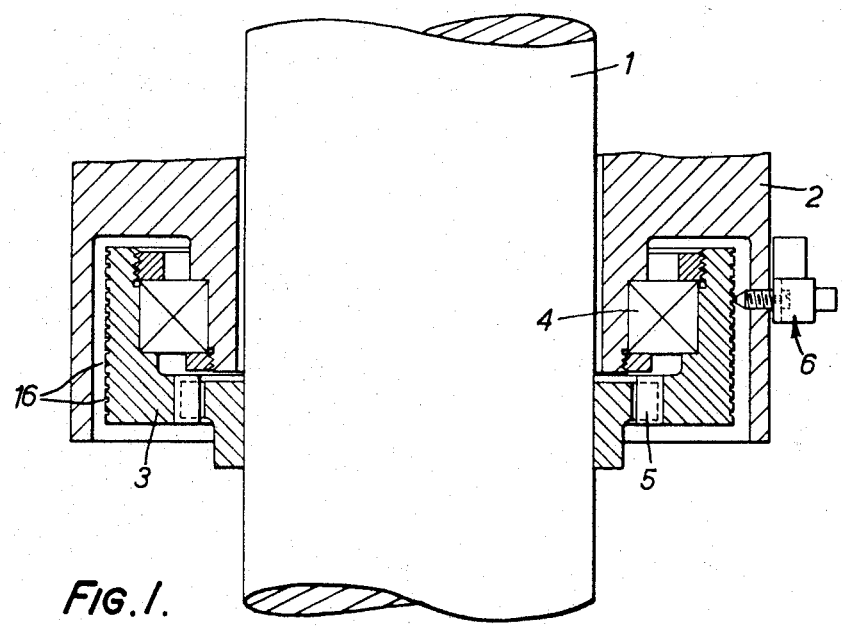
FIGURE 1 is a partly sectioned elevation of an angular position indicator in accordance with the invention.
Figure 2:
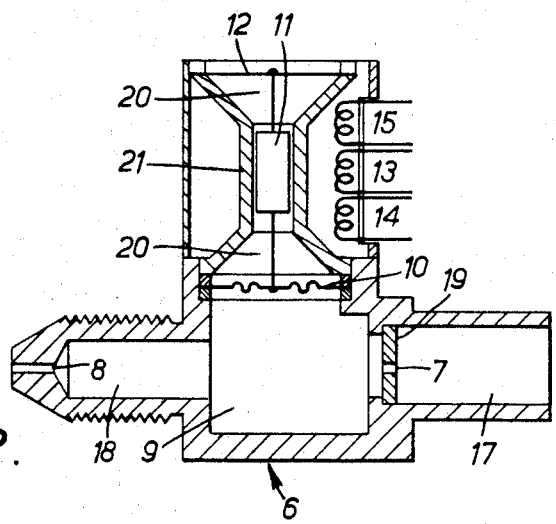
FIGURE 2 is, to an enlarged scale, a section through a part of the embodiment shown in FIGURE 1.

Referring to FIGURES 1 and 2 there is shown an aerial shaft 1 surounded by a fixed mounting 2. The mounting carries a scale drum 3 on a precision preloaded thrust bearing 4 arranged to provide suitable radial and axial constraint of the scale. The scale drum is coupled to the shaft 1 by means of a substantially backlash free coupling 5 similar to that described in British specification 758,383.

The scale drum 3 has a plurality, for example 13, of tracks of graduations 16 provided on its outer circumference these tracks being formed by embossing and each having raised and unraised portions corresponding to binary digits, the raised portions corresponding to one binary digit and the unraised portions to the other binary digit. A transducer 6 (shown in detail in FIGURE 2) is provided for each track. Each transducer includes an air conduit, formed by two passages 17 and 18 connected by a chamber 9. The passage 18 terminates in a nozzle 8, the mouth of which lies closely adjacent the respective track. Only one such transducer is shown in FIGURE 1. Actual track and spacing dimensions which have proved satisfactory in testing and which are given purely by way of example are a spacing of 5000ths of an inch between the transducer nozzle and the top of the raised track, a digit width in the direction of rotation of 5000ths of an inch and a difference of 5000ths of an inch between the levels of the raised and unraised portions.

The transducers are positioned at intervals around the circumference of the mounting 2. The chamber 9 of the air conduit for each transducer has one wall containing or comprised of a diaphragm 10. A plate 19 with an aperture 7 therein is positioned at the junction between the passage 17 and the cavity 9. A ferrite core or slug 11 is suspended between the diaphragm of a resilient spider 12 by wires 20, the slug lying between the coil former walls 21. An input winding 13 and two differential output windings 14 and 15 are arranged to be magnetically linked with the core 11. The output windings 14 and 15 form the unbalanced arms of a bridge network (not shown).

The angular position indicator arrangement shown in FIGURES 1 and 2 functions as follows:

The scale 3 is held accurately radially spaced from the transducers by the bearing 4 in the fixed mounting 2, misalignment of the aerial axis 1 with the centre of the scale being taken up by the coupling 5, thus avoiding errors of reading which would otherwise be produced by displacement of the scale with respect to the transducers due to the misalignment or eccentricity. Each angular increment of rotation is represented by a binary number formed by a binary digit taken from each track and during operation of the transducers continuously produce a signal corresponding to the binary digit on the track adjacent the respective nozzle, movement of the mounting shaft 1 through the minimum increment measurable changing the binary number read by the transducers. Obviously with the need for only a 5000ths of an inch spacing for each digit on a track the minimum increment can be made very small if the scale has a large diameter. Air is blown through the passages 17 and 18 and cavity 9 of each transducer on to the respective track and a pressure is set up in the cavity 9. The pressure set up in the cavity as a result of the resistance to air flow of a raised portion opposite the nozzle is different to the pressure set up when an unraised portion is opposite the nozzle. The raised portion presents a greater impedance to the flow of air out of the nozzle than does an unraised portion and therefore the pressure when the raised portion is present is higher.

The pressure in the cavity 9 acts on the diaphragm 10 and determines the position of the core 11 with relation to the windings 14, 13 and 15. The couplings of the coils 14 and 15 to the input coil 13 are therefore differentially controlled by the position of the core, more coupling occurring between the coils 13 and 15 when the pressure in the cavity 9 is higher as a result of a raised portion being opposite the nozzle than between the coils 14 and 13 and vice-versa. The outputs from the windings 14 and 15 give, therefore, a signal which is indicative of the graduation of the track opposite the nozzle and the combined output of the 13 transducers gives a continuous indication of the instantaneous angular position, represented in digital form, of the mounting shaft 1.

The scale tracks could of course if preferred and if the shaft 1 were suitably rigidly mounted be formed on the shaft or be connected directly to it.

Figure 3:
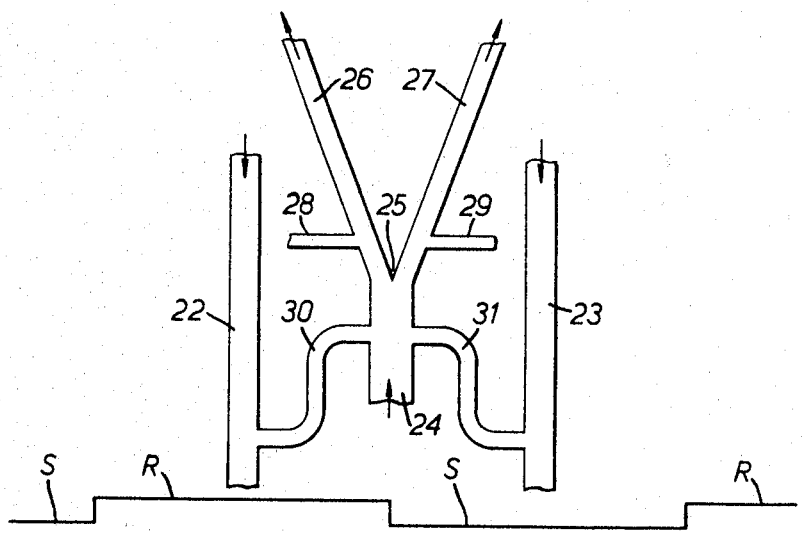
FIGURE 3 is a diagrammatic representation of an embodiment utilising the principles of the wall attachment fluid flow amplifier.

FIGURE 3 is a diagrammatic representation showing, so far as is necessary to an understanding of the manner in which it differs from FIGURES 1 and 2, an embodiment employing wall attachment fluid flow amplifiers only one of which is represented. Referring to FIGURE 3, the steps R represent raised track portions representative of one binary state and the depressions S represent unraised track portions representative of the other binary state. 22 and 23 are air conduits into which air is continuously pumped as indicated by the arrows from a suitable air supply pump (not shown). The conduits 22 and 23 terminate at mouths near the tracks. Between the conduits 22 and 23 is shown a wall attachment fluid flow amplifier having a main air flow pipe 24 into which air from the pump is forced as indicated by the arrow. The main air flow pipe is forked at a V-junction 25 into two similar branch pipes 26, 27 having vents 28, 29 a little downstream of the fork. Control pipes 30, 31 lead into the junction 25 at opposite sides thereof and communicate at their other ends with the interiors of the pipes 22 and 23 respectively at intermediate points thereof fairly near the mouths thereof. This arrangement has two stable operation states in one of which the major part of the air pumped into the pipe 24 emerges from the pipe 27 and in the other of which said major part emerges from the pipe 26. When one of these states is established it will be maintained so long as the conditions at the mouths of the conduits 22 and 23 remain unchanged but if a raised track portion at the mouth of one of these conduits is replaced by an unraised track portion or vice versa the state previously established will be replaced by the other. The air flow powers selectably available at the outlets of the branch pipes 26 and 27 can in practice readily be made very substantial indeed—quite adequate for the direct actuation of control apparatus without the interposition of air flow electric transducers and associated electric or electronic apparatus.

I claim:

1. In apparatus for providing a response dependent upon the angular position of a rotatable shaft, a plurality of separate tracks driven together in predetermined relation to rotation of said shaft, each track comprising raised and unraised portions representative of the two binary states; a plurality of fluid conduits separately respectively adjacent said separate tracks and each having a mouth positioned in closely spaced relation to its associated adjacent track; means for conducting fluid under pressure to said conduits for being discharged through the respective conduit mouths against the respective associated tracks; a plurality of fluid pressure responsive means respectively pneumatically connected to each of said fluid conduits and each being responsive to changes in pressure in the associated fluid conduit caused by movements of the associated track to place a raised or an unraised portion thereof adjacent the associated fluid conduit mouth; and means respectively operable by said fluid pressure responsive means for producing digital outputs dependent upon the angular position of said shaft.

2. An arrangement as claimed in claim 1 wherein each conduit ends in a nozzle through which fluid is forced and contains a chamber one wall of which contains a diaphragm responsive to pressure in the chamber.

3. An arrangement as claimed in claim 2 wherein the diaphragm is coupled to and adapted to move a ferromagnetic core magnetically linked to a plurality of coils one of which is fed with A.C. and from the others of which output signals are taken.

4. An arrangement as claimed in claim 3 wherein there are three coils, namely a middle fed coil and two output coils, the coupling of which to the fed coil are differentially controlled by the position of the core.

5. An arrangement as claimed in claim 1 wherein each of said fluid pressure responsive means comprises a wall attachment fluid flow amplifier.

6. An arrangement as claimed in claim 5 wherein each of said wall attachment fluid flow amplifiers comprises a pair of conduits, each having a mouth positioned in closely spaced relation to an associated one of said tracks, said mouths being spaced from each other along said associated track; and two control pipes communicating respectively with the two conduits of said pair of conduits.

7. An arrangement as claimed in claim 6 wherein means are provided for pumping fluid down each conduit of said pair of conduits to a mouth adjacent a track and each of said control pipes is in communication, at its end remote from the associated conduit, with the interior of a different fluid conduit at an intermediate point along the length thereof.

8. Apparatus according to claim 1 in which said tracks are circular about a common axis and in which said fluid conduits are positioned at intervals around said common axis.

9. An arrangement as claimed in claim 8 wherein the tracks are mounted side by side directly on the shaft.

10. An arrangement as claimed in claim 8 wherein the tracks surround the shaft and are coupled thereto by a coupling providing substantially backlash free drive from the shaft while permitting eccentricity as between the shaft axis and a common track axis.

References Cited

UNITED STATES PATENTS

| | | | |
|---|---|---|---|
| 2,665,579 | 1/1954 | Fortier | 73—37.6 |
| 3,066,000 | 11/1962 | James et al. | |
| 3,210,987 | 10/1965 | Bruns | 73—37.6 |
| 3,228,602 | 1/1966 | Boothe | 137—81.5 XR |
| 3,243,992 | 4/1966 | Woods | 73—37.5 |
| 3,246,507 | 4/1966 | Hyde | 73—37.5 XR |
| 3,258,023 | 6/1966 | Bowles | 137—81.5 |
| 3,353,402 | 11/1967 | Caligiuri | 73—37.5 |
| 3,363,448 | 1/1968 | Knobel | 73—37.6 |
| 3,202,180 | 8/1965 | Gray | 235—201 XR |
| 3,239,142 | 3/1966 | Levine | 235—201 |
| 3,267,481 | 8/1966 | Bauer et al. | 235—201 XR |
| 3,317,039 | 5/1967 | Wadey | 235—201 XR |

SAMUEL SCOTT, Primary Examiner.

U.S. Cl. X.R.

235—201